United States Patent [19]

Motosugi et al.

[11] Patent Number: 4,466,394

[45] Date of Patent: Aug. 21, 1984

[54] FLOW CONTROL DEVICE OF A HELICALLY-SHAPED INTAKE PORT

[75] Inventors: Katsuhiko Motosugi; Masatami Takimoto, both of Toyota; Ituo Koga, Okazaki, all of Japan

[73] Assignee: Toyota Jidosha Kogyo Kabushiki Kaisha, Aichi, Japan

[21] Appl. No.: 369,025

[22] Filed: Apr. 16, 1982

[30] Foreign Application Priority Data

Apr. 24, 1981 [JP] Japan .................................. 56-61424

[51] Int. Cl.³ ...................... F02B 31/00; F02M 35/10
[52] U.S. Cl. ................................. 123/188 M; 123/306
[58] Field of Search .................. 123/188 M, 306, 308, 123/52 M, 432

[56] References Cited

U.S. PATENT DOCUMENTS

| | | | |
|---|---|---|---|
| 3,850,479 | 11/1974 | Boyhont et al. | 302/29 |
| 4,174,686 | 11/1979 | Shimizu et al. | 123/188 M |
| 4,196,701 | 4/1980 | Tamura et al. | 123/188 M |
| 4,201,165 | 5/1980 | Tanaka et al. | 123/568 |
| 4,253,432 | 3/1981 | Nohira et al. | 123/52 M |
| 4,256,062 | 3/1981 | Schafer | 123/52 M |
| 4,257,384 | 3/1981 | Matsumoto | 123/575 |
| 4,312,309 | 1/1982 | Nakanishi et al. | 123/188 M |
| 4,347,816 | 9/1982 | Saito et al. | 123/308 |

FOREIGN PATENT DOCUMENTS

| | | | |
|---|---|---|---|
| 2059008 | 6/1972 | Fed. Rep. of Germany | |
| 0143289 | 8/1980 | German Democratic Rep. | 123/188 M |
| 52-127113 | 9/1977 | Japan | |
| 0058129 | 5/1979 | Japan | |
| 0019945 | 2/1980 | Japan | 123/308 |
| 0054922 | 5/1981 | Japan | |
| 0068519 | 4/1982 | Japan | |

Primary Examiner—Craig R. Feinberg
Assistant Examiner—W. R. Wolfe
Attorney, Agent, or Firm—Parkhurst & Oliff

[57] ABSTRACT

A helically-shaped intake port comprising a helical portion formed around an intake valve, and a substantially straight inlet passage portion tangentially connected to the helical portion. A bypass passage is branched off from the inlet passage portion and connected to the helical portion. A rotary valve is arranged in the bypass passage and actuated by a vacuum operated diaphragm apparatus. The rotary valve is opened when the amount of air fed into the cylinder of an engine is increased beyond a predetermined value.

13 Claims, 10 Drawing Figures

FLOW CONTROL DEVICE OF A HELICALLY-SHAPED INTAKE PORT

BACKGROUND OF THE INVENTION

The present invention relates to a flow control device of a helically-shaped intake port of an internal combustion engine.

A helically-shaped intake port normally comprises a helical portion formed around the intake valve of an engine, and a substantially straight inlet passage portion tangentially connected to the helical portion. However, if such a helically-shaped intake port is so formed that a strong swirl motion is created in the combustion chamber of an engine when the engine is operating at a low speed under a light load, that is, when the amount of air fed into the cylinder of the engine is small, since air flowing within the helically-shaped intake port is subjected to a great flow resistance, a problem occurs in that the volumetric efficiency is reduced when the engine is operating at a high speed under a heavy load, that is, when the amount of air fed into the cylinder of the engine is large.

An object of the present invention is to provide a helically-shaped intake port capable of creating a strong swirl motion in the combustion chamber when the amount of air fed into the cylinder is small, while preventing the volumetric efficiency from being reduced when the engine is operating at a high speed under a heavy load.

According to the present invention, there is provided a device for controlling the flow in a helically-shaped intake port of an internal combustion engine, said intake port comprising a helical portion formed around an intake valve, and a substantially straight inlet passage portion tangentially connected to the helical portion and having a helix terminating portion, said device comprising: a bypass passage branched off from the inlet passage portion and connected to the helix terminating portion of the helical portion; a normally closed rotary valve arranged in said bypass passage for controlling the flow area of said bypass passage, and; actuating means for actuating said rotary valve in response to the change in the amount of air fed into the intake port to open said rotary valve when said amount of air is increased beyond a predetermined value.

The present invention may be more fully understood from the description of a preferred embodiment of the invention set forth below, together with the accompanying drawings.

DESCRIPTION OF A PREFERRED EMBODIMENT

Figure 1:
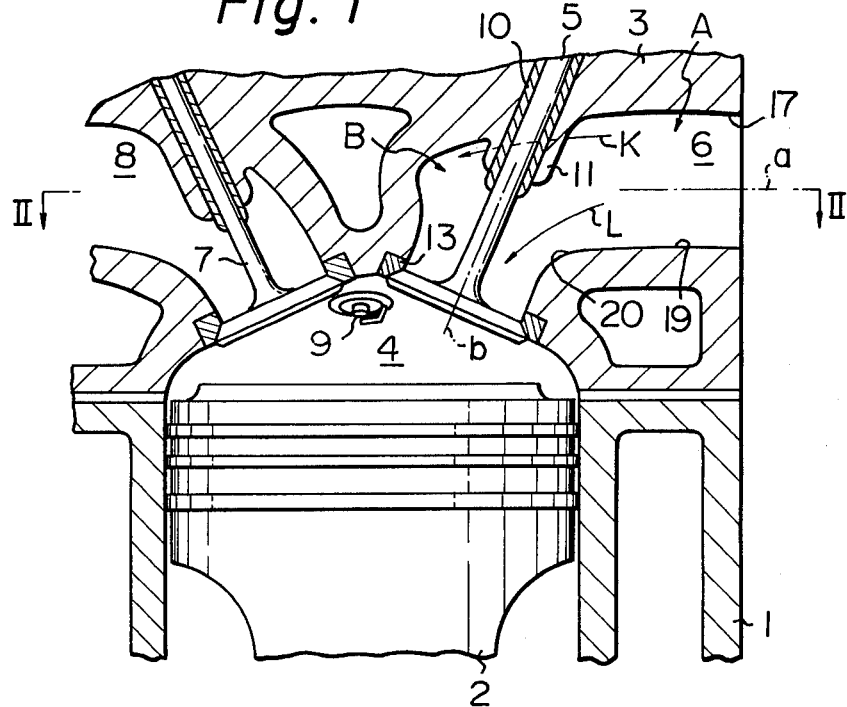
FIG. 1 is a cross-sectional side view of an internal combustion engine according to the present invention.
Figure 2:
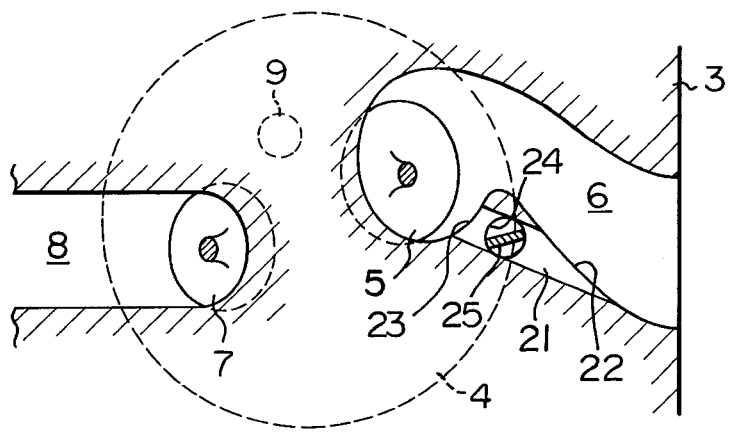
FIG. 2 is a plan view of the engine illustrated in FIG. 1.

Referring to FIGS. 1 and 2, 1 designates a cylinder block, 2 a piston reciprocally movable in the cylinder block 1, 3 a cylinder head fixed onto the cylinder block 1, and 4 a combustion chamber formed between the piston 2 and the cylinder head 3; 5 designates an intake valve, 6 a helically-shaped intake port formed in the cylinder head, 7 an exhaust valve, 8 an exhaust port formed in the cylinder head 3, and 9 a spark plug. As is illustrated in FIG. 1, a cylindrical projection 11, projecting downwardly for supporting a valve guide 10, is formed in one piece on the upper inner wall of the helically-shaped intake port 6, and the tip of the valve guide 10 projects from the tip of the cylindrical projection 11. At the time of the intake stroke, the mixture formed in the carburetor (not shown) is introduced into the combustion chamber 4 via the helically-shaped intake port 6 and the intake valve 5 and, then, the mixture is ignited by the spark plug 9 at the end of the compression stroke.

Figure 3:
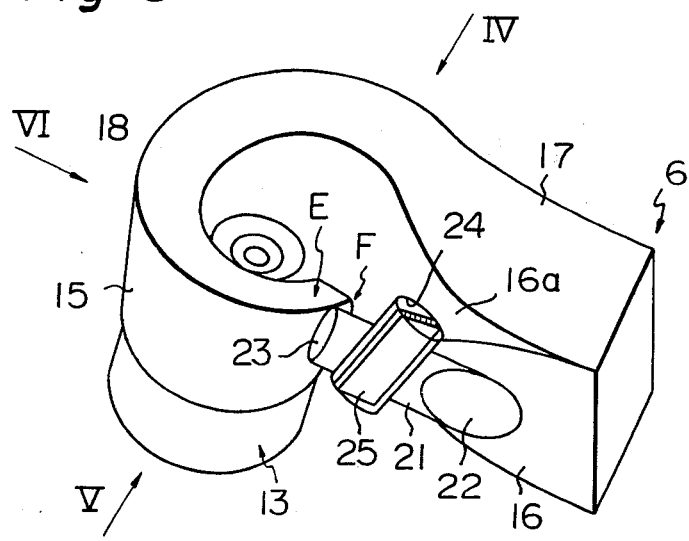
FIG. 3 is a perspective view of a helically-shaped intake port schematically illustrating the helically-shaped intake port illustrated in FIG. 1.
Figure 4:
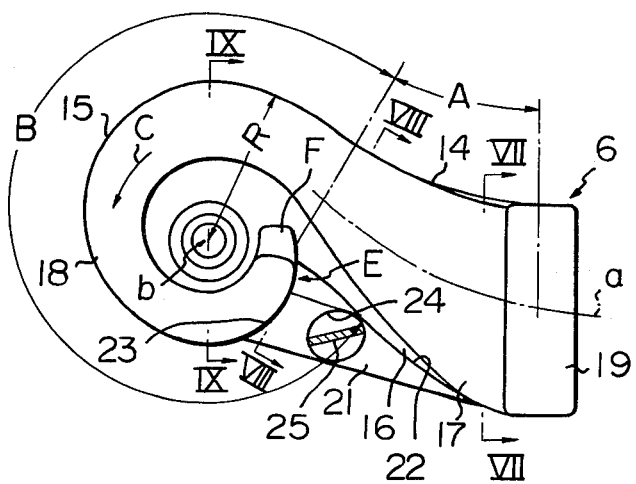
FIG. 4 is a plan view in the direction of the arrow IV in FIG. 3.
Figure 5:
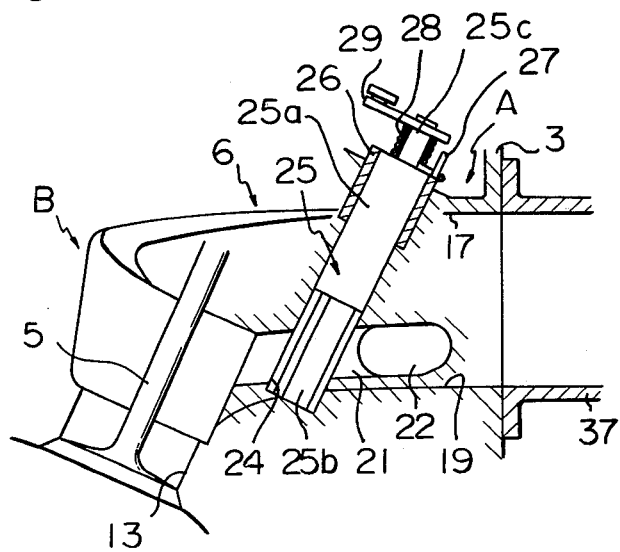
FIG. 5 is a side view in the direction of the arrow V in FIG. 3.
Figure 6:
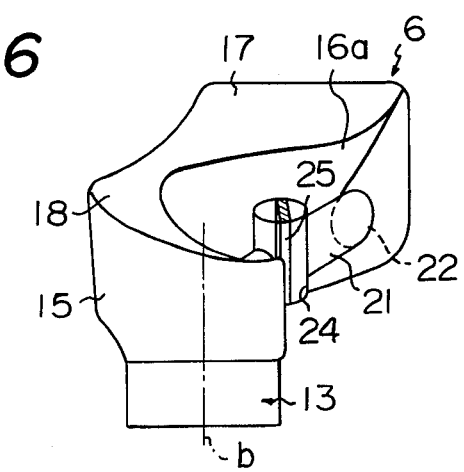
FIG. 6 is a side view in the direction of the arrow VI in FIG. 3.
Figure 7:
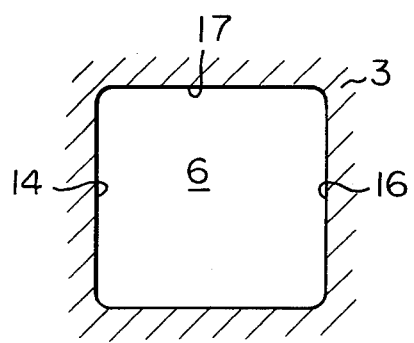
FIG. 7 is a cross-sectional view taken along the line VII—VII in FIG. 4.
Figure 9:
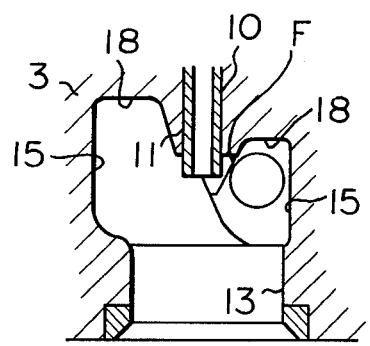
FIG. 9 is a cross-sectional view taken along the line IX—IX in FIG. 4.

FIGS. 3 through 6 schematically illustrate the shape of the helically-shaped intake port 6 illustrated in FIG. 1. As is illustrated in FIG. 4, the helically-shaped intake port 6 comprises an inlet passage portion A and a helical portion B, the longitudinal central axis of the inlet passage portion A being slightly curved. The inlet open end of the inlet passage portion A has a rectangular cross-section, as illustrated in FIG. 7, and the mixture outlet portion 13 of the helical portion B has a cylindrical inner wall which extends circumferentially about the helix axis b of the helical portion B. As illustrated in FIG. 1, the helix axis b, that is, the axis of the intake valve 5, is slightly inclined with respect to the axis of the cylinder, and the inlet passage portion A extends substantially horizontally. The side wall 14 of the inlet passage portion A, which is located remote from the helix axis b, is arranged so as to be substantially vertical and is smoothly connected to the side wall 15 of the helical portion B, which extends circumferentially about the helix axis b. As illustrated in FIGS. 6 and 9, the side wall 15 of the helical portion B is so formed that it expands outwards from the cylindrical inner wall of the mixture outlet portion 13. In addition, as is illustrated in FIG. 4, the side wall 15 is so formed that the distance R between the side wall 15 and the helix axis b is maintained constant at a position near the inlet passage portion A and is gradually reduced towards the helical direction C. The distance R becomes approximately equal to the radius of the cylindrical inner wall of the mixture outlet portion 13 at the helix terminating portion E.

Figure 8:
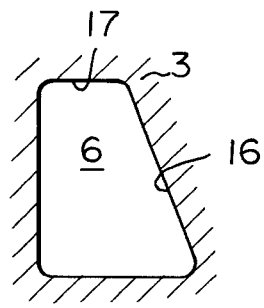
FIG. 8 is a cross-sectional view taken along the line VIII—VIII in FIG. 4.

The side wall 16 of the inlet passage portion A, which is located near the helix axis b, has on its upper portion an inclined wall portion 16a which is arranged to be directed downwards. The width of the inclined wall portion 16a is gradually increased towards the helical portion B and, as is illustrated in FIG. 8, the entire portion of the side wall 16 is inclined at the connecting portion of the inlet passage portion A and the helical portion B. The upper half of the side wall 16 is smoothly connected to the circumferential wall of the cylindrical projection 11, and the lower half of the side wall 16 is connected to the side wall 15 of the helical portion B at the helix terminating portion E of the helical portion B.

As is illustrated in FIGS. 1 and 5, the upper wall 17 of the inlet passage portion A extends substantially horizontally from the inlet open end of the inlet passage portion A towards the helical portion B, and the upper wall 18 gradually descends towards the helical direction C (FIG. 4) and is connected to the side wall 16 of the inlet passage portion A. Since the inclined wall portion 16a of the inlet passage portion A is so formed that the width thereof is gradually increased towards the helical portion B, as mentioned above, the width of the upper wall 17 of the inlet passage portion A is gradually reduced. In addition, since the side wall 15 of the helical portion B is so formed that the distance R between the side wall 15 and the helical axis b is maintained constant at a position near the inlet passage portion A and is gradually reduced towards the helical direction C, as mentioned above, the width of the upper wall 18 of the helical portion B is gradually reduced towards the helical direction C. Consequently, it will be understood that the upper wall 17 of the inlet passage portion A extends substantially horizontally towards the helical portion B, while the width of the upper wall 17 is gradually reduced, and; that the upper wall 18 of the helical portion B gradually descends towards the helical direction C, while the width of the upper wall 18 is gradually reduced. As illustrated in FIGS. 3, 4 and 9, the upper wall 18 is connected to a steeply inclined wall F arranged to be directed downwards at the helix terminating portion E.

As is illustrated in FIGS. 1 and 5, the bottom wall 19 of the inlet passage portion A extends substantially horizontally in parallel with the upper wall 17 towards the helical portion B and is connected to the cylindrical inner wall of the mixture outlet portion 13 via a smoothly curved wall 20 as illustrated in FIG. 1. From FIG. 4, it will be understood that the width of the bottom wall 19 is gradually reduced towards the helical portion B.

Figure 10:
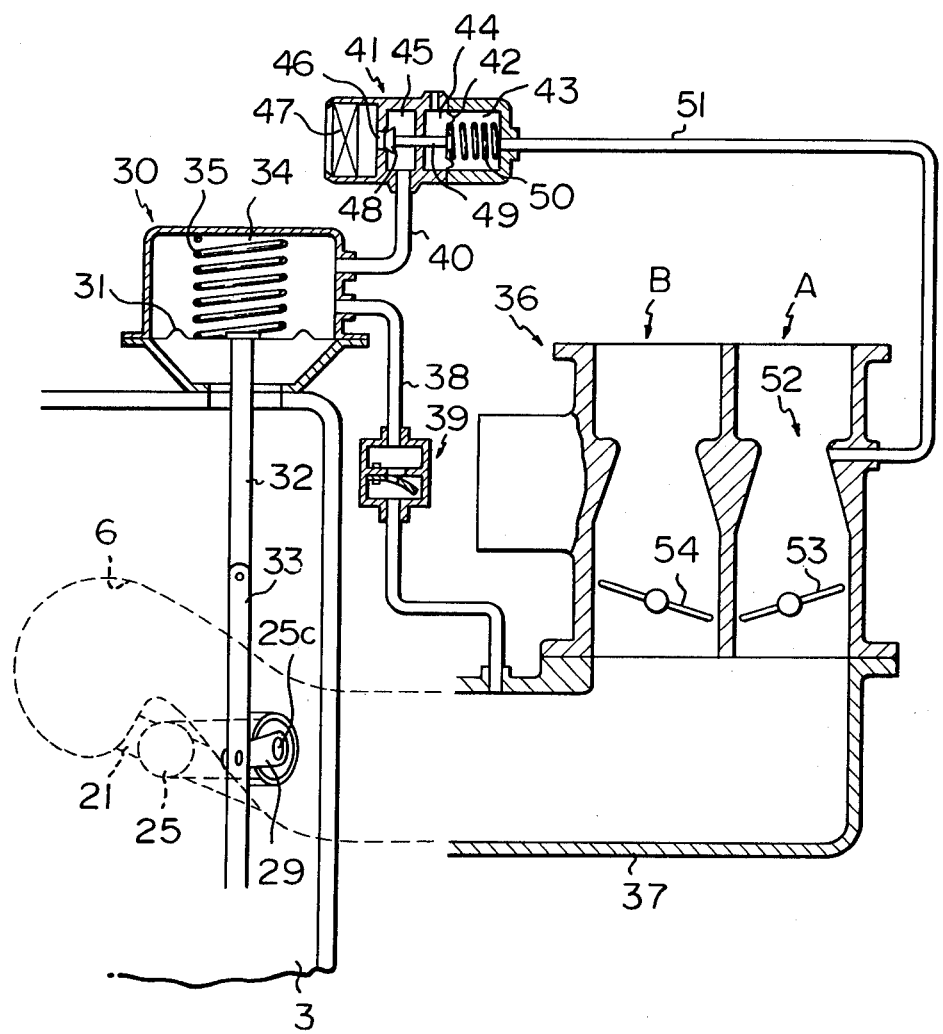
FIG. 10 is a schematic view of a flow control device.

As illustrated in FIGS. 2 through 6, a bypass passage 21, branched off from the inlet passage portion A and having a substantially uniform cross-section, is formed in the cylinder head 3, and this bypass passage 21 is connected to the helix terminating portion E. The inlet opening 22 of the bypass passage 21 is formed on the side wall 16 at a position located near the inlet open end of the inlet passage portion A, and the outlet opening 23 of the bypass passage 21 is formed on the upper end portion of the side wall 15 at the helix terminating portion E. It is required that the bypass passage 21 have a cross-sectional area which is larger than 0.3 times the minimum cross-sectional area of the intake port 6. As illustrated in FIG. 5, a cylindrical bore 24, extending across the bypass passage 21, is formed in the cylinder head 3, and a rotary valve 25 is inserted into the cylindrical bore 24. The rotary valve 25 comprises a cylindrical portion 25a, a plate-shaped valve portion 25b extending through the bypass passage 21, and a reduced diameter projecting portion 25c projecting from the top face of the cylindrical portion 25a. The cylindrical portion 25a is rotatably supported by a hollow sleeve 26 which is fixed onto the cylinder head 3. A torsion coil spring 28 is arranged between the reduced diameter projecting portion 25c of the rotary valve 25 and a projecting arm 27 of the hollow sleeve 26, so that the rotary valve 25 is always biased towards the closed position by means of the coil spring 28. As illustrated in FIGS. 5 and 10, an arm 29 is fixed onto the reduced diameter projecting portion 25c of the rotary valve 25, and the tip of the arm 29 is connected via a connecting rod 33 to a control rod 32 which is fixed onto a diaphragm 31 of a vacuum operated diaphragm apparatus 30. The diaphragm apparatus 30 comprises a vacuum chamber 34 separated from the atmosphere by the diaphragm 31, and a compression spring 35 for biasing the diaphragm 31 is inserted into the vacuum chamber 34.

An intake manifold 37, equipped with a compound type carburetor 36 comprising a primary carburetor A and a secondary carburetor B, is mounted on the cylinder head 3, and the vacuum chamber 34 is connected to the interior of the intake manifold 37 via a vacuum conduit 38. A check valve 39, permitting air to flow from the vacuum chamber 34 into the intake manifold 37, is arranged in the vacuum conduit 38. In addition, the vacuum chamber 34 is connected to the atmosphere via an atmosphere conduit 40 and a control valve 41. This control valve 41 comprises a vacuum chamber 43 and an atmospheric pressure chamber 44 which are separated by a diaphragm 42 and, in addition, the control valve 41 further comprises a valve chamber 45 arranged adjacent to the atmospheric pressure chamber 44. The valve chamber 45 is connected, on one hand, to the vacuum chamber 34 via the atmosphere conduit 40 and, on the other hand, to the atmosphere via a valve port 46 and an air filter 47. A valve body 48, controlling the opening operation of the valve port 46, is arranged in the valve chamber 45 and connected to the diaphragm 42 via a valve rod 49. A compression spring 50 for biasing the diaphragm 42 is inserted into the vacuum chamber 43, and the vacuum chamber 43 is connected to a venturi portion 52 of the primary carburetor A via a vacuum conduit 51.

The carburetor 36 is a conventional carburetor. Consequently, when the opening degree of a primary throttle valve 53 is increased beyond a predetermined degree, a secondary throttle valve 54 is opened and, when the primary throttle valve 53 is fully opened, the secondary throttle valve 54 is also fully opened. The level of vacuum produced in the venturi portion 52 of the primary carburetor A is increased as the amount of air fed into the cylinder of the engine is increased. Consequently, when a great vacuum is produced in the venturi portion 52, that is, when the engine is operating at a high speed under a heavy load, the diaphragm 42 of the control valve 41 moves towards the right in FIG. 10 against the compression spring 50. As a result of this, the valve body 48 opens the valve port 46 and, thus, the vacuum chamber 34 of the diaphragm apparatus 30 becomes open to the atmosphere. At this time, the diaphragm 31 moves downward in FIG. 10 due to the spring force of the compression spring 35 and, thus, the rotary valve 25 is rotated and fully opens the bypass passage 21.

On the other hand, in the case wherein the opening degree of the primary throttle valve 53 is small, since the vacuum produced in the venturi portion 52 is small, the diaphragm 42 of the control valve 41 moves towards the left in FIG. 10 due to the spring force of the compression spring 50 and, as a result, the valve body 48 closes the valve port 46. In addition, in the case wherein the opening degree of the primary throttle valve 53 is small, a great vacuum is produced in the intake manifold 37. Since the check valve 39 opens when the level of vacuum produced in the intake manifold 37 becomes greater than that of the vacuum produced in the vacuum chamber 34, and since the check valve 39 closes when the level of the vacuum produced in the intake manifold 37 becomes smaller than that of the vacuum produced in the vacuum chamber 34, the level of the vacuum in the vacuum chamber 34 is maintained at the maximum vacuum which has been produced in the intake manifold 37 as long as the control valve 41 remains closed. If a vacuum is produced in the vacuum chamber 34, the diaphragm 31 moves upward in FIG. 10 against the compression spring 35 and, as a result, the rotary valve 25 is rotated and closes the bypass passage 21. Consequently, when the engine is operating at a low speed under a light load, the bypass passage 21 is closed by the rotary valve 25. In the case wherein the engine speed is low even if the engine is operating under a heavy load, and in the case wherein the engine is operating under a light load even if the engine speed is high, since the vacuum produced in the venturi portion 52 is small, the control valve 41 remains closed. Consequently, when the engine is operating at a low speed under a heavy load and at a high speed under a light load, since the level of the vacuum in the vacuum chamber 34 is maintained at the above-mentioned maximum vacuum, the bypass passage 21 is closed by the rotary valve 25.

As mentioned above, when the engine is operating at a low speed under a light load, that is, when the amount of air fed into the cylinder of the engine is small, the rotary valve 25 closes the bypass passage 21. At this time, a part of the mixture introduced into the inlet passage portion A moves forward along the upper walls 17 and 18, as illustrated by the arrow K in FIG. 1, and the remaining part of the mixture impinges upon the inclined wall portion 16a and is deflected downwards. As a result, the remaining part of the mixture flows into the mixture outlet portion 13 without swirling, as illustrated by the arrow L in FIG. 1. Since the widths of the upper walls 17 and 18 are gradually reduced towards the flow direction of the mixture as mentioned above, the cross-section of the flow path of the mixture flowing along the upper walls 17 and 18 is gradually reduced towards the flow direction of the mixture. In addition, since the upper wall 18 gradually descends towards the helical direction C, the mixture flowing along the upper walls 17 and 18 is deflected downwards, while the velocity thereof is gradually increased. As a result of this, a swirl motion moving downwards while swirling is created in the helical portion B and, in addition, this swirl motion causes a swirl motion of the mixture flowing into the mixture outlet portion 13, as illustrated by the arrow L in FIG. 1. Then, the mixture moves downwards while smoothly swirling along the cylindrical inner wall of the mixture outlet portion 13 and, thus, a strong swirl motion rotating about the helix axis b is created within the mixture outlet portion 13. Then, this swirling mixture flows into the combustion chamber 4 via the valve gap formed between the intake valve 5 and its valve seat and causes a strong swirl motion in the combustion chamber 4.

When the engine is operating at a high speed under a heavy load, that is, when the amount of air fed into the cylinder of the engine is large, since the rotary valve 25 opens the bypass passage 21, a part of the mixture introduced into the inlet passage portion A is fed into the helical portion B via the bypass passage 21 having a low flow resistance. Since the flow direction of the mixture stream flowing along the upper wall 18 of the helical portion B is deflected downward by the steepling inclined wall F of the helix terminating portion E, a great vacuum is produced at the helix terminating portion E, that is, in the outlet opening 23 of the bypass passage 21. Consequently, since the pressure difference between the vacuum in the inlet passage portion A and the vacuum in the helix terminating portion E becomes large, a large amount of the mixture is fed into the helical portion B via the bypass passage 21 when the rotary valve 25 opens. As mentioned above, when the engine is operating at a high speed under a heavy load, since the rotary valve 25 opens, the entire flow area of the intake port 6 is increased, and a large amount of the mixture is fed into the helical portion B via the bypass passage 21 having a low flow resistance. As a result of this, it is possible to obtain a high volumetric efficiency. In addition, by forming the inclined wall portion 16a as mentioned previously, since a part of the mixture introduced into the inlet passage portion A flows into the mixture outlet portion 13 along the smoothly curved wall 20 without swirling, the flow resistance, to which the mixture flowing in the helically-shaped intake port 6 is subjected, becomes considerably small as compared with that in a conventional helically-shaped intake port. As a result of this, a high volumetric efficiency can be ensured when an engine is operating at a high speed under a heavy load.

According to the present invention, it is possible to create a strong swirl motion in the combustion chamber when an engine is operating at a low speed under a light load, while ensuring a high volumetric efficiency when an engine is operating at a high speed under a heavy load by forming the bypass passage, the opening operation of which is controlled by the rotary valve.

While the invention has been described with reference to a specific embodiment chosen for purposes of illustration, it should be apparent that numerous modifications could be made thereto by those skilled in the art without departing from the spirit and scope of the invention.

We claim:

1. A device for controlling the flow in a helically-shaped intake port of a cylinder head of an internal combustion engine in order to increase the volumetric efficiency of the engine, said intake port comprising a helical portion around an intake valve, and a substantially straight inlet passage portion tangentially connected to the helical portion and having a helix terminating portion, said device comprising:

a bypass passage entirely within said cylinder head, said bypass passage having one end directly connected to the inlet passage portion and its other end opening into an upper end of the helix terminating portion of the helical portion such that the flow into the upper end of the helix terminating portion from the bypass portion is in a direction opposite to a swirl flow in the helix terminating portion;

a normally closed rotary valve arranged in said bypass passage for controlling the flow area of said bypass passage; and actuating means for actuating said rotary valve in response to the change in the amount of air fed into the intake port to open said rotary valve when said amount of air is increased beyond a predetermined value, the opening of the valve reducing the swirl flow and thereby increasing the volumetric efficiency.

2. A device according to claim 1, wherein said bypass passage has an outlet opening which is open to the helical portion at a position near a top wall of the helical portion.

3. A device according to claim 2, wherein the top wall of the helical portion has a steeply inclined wall portion at the helix terminating portion, the outlet opening of said bypass passage being arranged near said steeply inclined wall portion.

4. A device according to claim 1, wherein said rotary valve is rotatably inserted into a cylindrical bore which is arranged across said bypass passage.

5. A device according to claim 4, wherein said cylindrical bore has a substantially uniform cross-section.

6. A device according to claim 4, wherein said rotary valve comprises a plate-shaped valve portion extending through said bypass passage.

7. A device according to claim 1, wherein the intake passage portion has an inlet open end located further from the helical portion, said bypass passage having an inlet opening which is open to the inlet passage portion at a position near said inlet open end.

8. A device according to claim 7, wherein the intake passage portion comprises an upper wall, a bottom wall, a first side wall located near the intake valve and a second side wall located remote from the intake valve, said first side wall comprising a downwardly inclined portion located near the helical portion, and a substantially vertical portion located near said inlet open end, the inlet opening of said bypass passage being formed on said vertical portion.

9. A device according to claim 8, wherein the intake port comprises a valve guide projecting into the helical portion from an upper wall of the helical portion and having a circumferential wall, said downwardly inclined portion being tangentially connected to the circumferential wall of said valve guide.

10. A device according to claim 1, wherein said actuating means comprises a vacuum chamber, a diaphragm connected to said rotary valve and actuated in response to a change in the level of the vacuum in said vacuum chamber, and a control apparatus maintaining the level of the vacuum in said vacuum chamber at the maximum vacuum which has been produced in the intake port when the amount of air fed into the intake port is smaller than said predetermined value and connecting said vacuum chamber to the atmosphere when said amount of air is larger than said predetermined value.

11. A device according to claim 10, wherein said control apparatus comprises a check valve arranged between the intake port and said vacuum chamber for allowing only the outflow of air from said vacuum chamber, and a control valve for controlling the fluid connection between said vacuum chamber and the atmosphere to connect said vacuum chamber to the atmosphere when said amount of air is larger than said predetermined value.

12. A device according to claim 11, wherein the engine comprises a carburetor connected to the intake port and having a venturi portion, said control valve being actuated in response to a change in the level of the vacuum produced in said venturi portion.

13. A device according to claim 12, wherein said control valve comprises a valve body for controlling the fluid connection between said vacuum chamber and the atmosphere, a vacuum cavity connected to said venturi portion, and a diaphragm connected to said valve body and actuated in response to a change in the level of the vacuum produced in said vacuum cavity.

* * * * *